Patented Jan. 15, 1952

2,582,829

UNITED STATES PATENT OFFICE 2,582,829

PRODUCTION OF RUBBER PRODUCTS

Lynn Harbison, Akron, Ohio, assignor to Phillips Petroleum Company, a corporation of Delaware No Drawing. Application December 3, 1948, Serial No. 63,435

10 Claims. (Cl. 260—782)

This invention relates to the production of rubber products. In one of its more specific aspects it relates to the retardation of vulcanization of rubber mixes. In still another one of its more specific aspects it relates to retarding too rapid vulcanization of a rubber mix caused by high pH carbon black. In still another of its more specific aspects it relates to new vulcanized rubber products.

In the manufacture of rubber products, crude rubber is milled with the desired fillers, softeners, sulfur, accelerators, etc. In the first stage of plant processing, carbon black and other ingredients, except the accelerator of vulcanization and sulfur, are added with the mixing temperature usually reaching a maximum in the range of 290 to 330° F., especially for tread compounds. The mixed stock, whether mill mixed or Banbury mixed, is cooled with a water spray in order to aid in reducing the temperature of the mixed stock to room temperature as soon as possible. After this first-stage mixing, the rubber mix is placed on what is termed a "sheet-out" mill and the mixed stock is cut in slabs and subjected to a water spray. These slabs are then cooled in the air, usually for about one-half to three-quarters of an hour, and then placed on a skid to age, generally for a minimum of 5 hours. A second step is to take this master batch form and add the accelerator and sulfur in a Banbury mixer or on a mill. During this step the temperature should not be greater than 230° F., decidedly cooler than the original mix when the carbon black is added. This final mix is cooled with a water spray, air-cooled and then aged at room temperature. This mixed stock is cooled as rapidly as possible in order to avoid "scorched" material. The next step in processing is calendering or tubing which is usually carried on in the range of 150 to 300° F. The calendered or tubed product is then vulcanized. The most common vulcanizing temperature for tires is 260 to 300° F. For very large tires the curing temperature may be dropped to as low as 260° F. In the case of molded industrial products, a temperature of about 320° F. is the upper range at which vulcanization is carried out. In carrying out the plant processes of second-stage mixing and of calendering or tubing or making a molded industrial product, it is necessary that the mixed rubber not be partially vulcanized prematurely. If vulcanization occurs prematurely in factory processing, factory operations cannot be carried out efficiently. This premature vulcanization is known as scorching.

In the manufacture of rubber products accelerators of vulcanization are added to speed up the curing of the formed rubber product. Today the usual practice is to use certain well-known accelerators of vulcanization, usually semi-ultra and/or ultra organic accelerators, which not only have the property of speeding up the curing process but also through their action give a rubber product which has good physical properties such as high tensile strength, high resistance to abrasion, etc. Many organic accelerators of vulcanization need to be activated so that they will effectively accelerate vulcanization. Chief among these activators is zinc oxide which is usually used in conjunction with stearic acid. Many organic accelerators of vulcanization speed up the curing process to a greater extent than is desired; therefore, it is necessary to use a retarder of vulcanization so that the rubber mix will not vulcanize so rapidly so as to make it impossible to carry out the necessary steps of factory processing. The rubber compounder and the rubber industry are always striving to find new methods of retarding vulcanization so that the rubber and/or rubber mix can be processed efficiently and so that the final rubber product will have improved physical characteristics.

In recent years many new carbon blacks have become available to the rubber industry. Chief among these new carbon blacks are combustion furnace blacks, which in general have a higher pH than the older type of channel black or thermal furnace carbon blacks. Combustion furnace carbon blacks usually have a pH of from 8 to 10.5, more frequently from 8.6 to 10.1. For instance, one commercially available high abrasion combustion furnace (HAF) black, has a pH of approximately 9.1 and a commercially available high modulus combustion furnace (HMF) black, has a pH of approximately 9.7. In contrast to these furnace blacks, channel blacks usually have a pH value on the acid side in the neighborhood of 3.8 to 6. Furnace blacks such as those just mentioned have many characteristics which add useful properties to the finished rubber product. Thus the HAF black has a high degree of "structure" and rubber products containing this black have exceptionally high resistance to abrasion. There are several high pH furnace blacks now on the market which add valuable properties to the finished rubber product. These high pH carbon blacks have caused considerable difficulty to the rubber compounder and processor as pointed out by C. W. Sweitzer and W. C. Goodrich in The Rubber Age, volume 55, No. 5, August 1944, at page 471. The pH of the carbon black has a decided effect on the rate of vulcanization. High pH carbon blacks usually accelerate cure or vulcanization. Sweitzer and Goodrich point out that due to this factor economy in organic acceleration is permitted. However, in most cases changing the recipe of a rubber mix, that is, changing the amount of organic accelerator and sulfur, also changes the properties of the finished rubber product. It has an effect on such properties as tensile strength, heat build-up, the compression set, the hardness, the resistance to abrasion, the modulus of elasticity, the elongation, etc. For instance, accelerator starvation with HAF black results in low abrasion resistance. The compounder using these high pH carbon blacks has been confronted with the problem of maintaining the desired properties in the finished product by maintaining the proper amount of retarder, accelerator and sulfur while trying to overcome the problem of scorch or premature vulcanization. Well-known retarders of vulcanization such as N-nitroso diphenyl amine, rosin, salicyclic acid in a dispersing agent and inorganic peroxides, such as lead peroxide have been unsuccessful in overcoming the problem of too rapid vulcanization caused by the use of high PH carbon blacks.

I have discovered that zinc peroxide will retard vulcanization of a rubber mix containing a high pH carbon black and will improve the properties of the final rubber product, particularly the property of resistance to abrasion. Incorporating zinc peroxide in a rubber mix will effectively slow up vulcanization so that the rubber mix may be processed without encountering scorch. I have discovered a new method for retarding vulcanization of a rubber mix which comprises incorporating zinc peroxide and zinc oxide in various proportions into the rubber mix. The use of zinc peroxide and zinc oxide with accelerators of vulcanization, particularly semi-ultra and ultra organic accelerators, improves the physical properties of the finished rubber product, particularly the properties of resistance to abrasion and tensile strength. A great advantage of my invention is that the use of zinc peroxide in conjunction with zinc oxide to effect the retardation of vulcanization will overcome any problem of scorching, such as that caused by the use of a high pH carbon black, and, at the same time, improve the physical properties of the finished rubber product.

An object of this invention is to provide a method for retarding vulcanization of rubber mixes.

Another object of this invention is to provide a method by which premature vulcanization, caused by the use of high pH carbon blacks in conjunction with organic accelerators of vulcanization, can be overcome.

Still another object of this invention is to produce new vulcanized rubber products with improved properties.

Still another object of this invention is to provide a method to increase the Mooney scorch time of a rubber mix which has a low scorch time due to a high pH carbon black being used in the mix.

Still another object of this invention is to provide a method of retarding vulcanization of a rubber mix so as to overcome the problem of scorch during processing and to give the finished rubber product improved physical properties.

Many other objects will become apparent, to one skilled in the art, from this disclosure.

Premature vulcanization, referred to as "scorch" during the processing of rubber products, must be prevented in order to allow the rubber mix to be preformed and shaped before it is cured or vulcanized. Testing methods, run on test samples, have been devised and standards have been set so as to determine if a particular rubber mix will scorch during processing. The most frequently used testing method is that run on a Mooney Shearing Disc viscometer. These Mooney viscometers come equipped with a large rotor (1½ inches in diameter) and a small rotor (1⅞ inches in diameter). The viscometer can be set to operate at a given temperature. The Mooney scorch test is made by using the small rotor with the machine usually set to operate either at 250° F. or 265° F., that is, the temperature of the rubber sample on which the scorch test is being run is held at 250° F. or 265° F. Primarily, the instrument consists of a disc rotor which turns in a shallow cylindrical chamber recessed into two horizontal platens. The surfaces of the chamber and rotor are knurled to prevent slippage. The sample is formed in place around the rotor as the chamber is closed. The rubber is sheared by the rotor which is driven by a synchronous motor. The resistance of the rubber to this shearing action develops a thrust in a floating horizontal worm shaft which presses against a deflecting U-shaped steel spring. The deflection is read on a dial gauge and is proportional to the true mean viscosity of the sample. In determining the scorch time, deflection readings are taken at one minute intervals until the deflection of the indicator increases appreciably. At this point the viscosity of the rubber mix sample has increased due to the beginning of vulcanization. The Mooney scorch time is then given as the time in minutes at which vulcanization began, indicated by the appreciable increase in viscosity readings. In this disclosure Mooney scorch time when used means the time in minutes at which the viscosity of the sample began to increase appreciably because of vulcanization. Mooney Shearing Disc viscometers are widely used in the rubber industry, and one skilled in the art will have no difficulty in determining and understanding what I mean by the Mooney scorch time.

I have discovered that zinc peroxide will effectively retard vulcanization of rubber mixes which vulcanize too rapidly due to the use of a high pH carbon black and that zinc peroxide used in conjunction with zinc oxide in various proportions will regulate the rate of cure or vulcanization of a rubber mix so as to avoid scorching and so as to give a rubber product with improved properties. The zinc peroxide can be incorporated in the rubber mix before, during or after the other ingredients are added. In practicing my invention, the zinc peroxide can be added on a mill or in a Banbury mixer or it may be mixed with the carbon black before the black is added in the first stage of mixing. The zinc peroxide used in the practice of my invention is useful and will retard too rapid vulcanization caused by a high pH carbon black in rubber mixes containing natural, synthetic or reclaimed rubber, or various mixtures of the above-mentioned types of rubber. The zinc peroxide of my invention is particularly adaptable to the problems of tire tread manufacture in which the rubber mix from which the tread is formed contains from 40 to 65 parts by weight of carbon black per 100 parts of rubber, usually natural rubber or synthetic copolymers of butadiene-styrene, such as GR-S rubber and recently developed low-temperature variants thereof. Most rubber mixes contain from 10 to 65 parts by weight of carbon black per 100 parts of rubber. The problem of too rapid vulcanization becomes greater as the amount of high pH carbon black is increased; therefore, it is necessary that a greater amount of zinc peroxide be added as the amount of carbon black is increased in order to effectively retard vulcanization. In practicing my invention, one skilled in the art will have no trouble in determining the amount of zinc peroxide necessary to effectively retard vulcanization for any particular recipe or rubber mix. The Mooney scorch time for any particular rubber mix may be determined and the addition of zinc peroxide will increase this Mooney scorch time so that there will be no problem of premature vulcanization during processing. Or the mixed batch containing the predetermined portions of zinc peroxide and zinc oxide may be tested for Mooney scorch time, and if the Mooney scorch time is too low for safe and efficient processing, additional quantities of zinc peroxide may be added.

My invention is applicable to rubber mixes containing organic accelerators of vulcanization, such as dithiocarbamates, xanthates, thiuram sulphides, mercaptobenzothiazoles, vulcanol, aldehydamines, guanidines, p-nitroso dimethylaniline, ethylidene-aniline, aldehydeammonia, hexamethylene-tetramine, or various mixtures of the aforementioned organic accelerators. The ultra and semi-ultra accelerators of vulcanization tend to cause scorching when used with high pH carbon blacks. My invention is particularly adaptable to retarding vulcanization in rubber mixes containing mercaptobenzothiazole or its derivatives, such as benzothiazyl disulfide, zinc benzothiazyl sulfide, acyl benzothiazyl sulfides and the dinitro phenyl ester of mercaptobenzothiazole, thiuram sulphides, such as thiuram monosulphide, guanidines, such as diphenylguanidine, or various mixtures of the aforementioned organic accelerators. I find that zinc peroxide gives particularly excellent results with N-cyclohexyl-2-benzothiazole sulfenamide, a widely used delayed action accelerator known as Santocure which is activated by high pH carbon black so that it loses some of its property of delaying rapid acceleration of vulcanization, or in effect delaying rapid vulcanization, until the curing step of processing.

My invention is desirably practiced in one of two ways. First, the rubber compounder or processor confronted with the problem of scorch may overcome that problem by incorporating zinc peroxide into the rubber mix, that is, when the compounder or processor is using established compounding recipes containing conventional amounts of zinc oxide, usually up to 5 parts by weight of zinc oxide per 100 parts of rubber. In this case, I find that incorporating from 0.25 to 4.5, preferably 0.5 to 2.5, parts by weight of zinc peroxide per 100 parts of rubber will overcome the problem of scorch. For example, rubber mixes in which N-cyclohexyl-2-benzothiazole sulfenamide is the accelerator usually contains from 0.25 to 1.75 parts by weight of the accelerator, 2 to 3 parts by weight of sulfur and up to 5 parts by weight of zinc oxide, per 100 parts of rubber. Zinc peroxide in the range of 0.25 to 4.5 parts by weight per 100 parts of rubber will effectively retard vulcanization or increase the Mooney scorch time of such a rubber mix. 0.35 to 0.65 parts by weight of N-cyclohexyl-2-benzothiazole sulfenamide per 100 parts of rubber with 2 to 2.75 parts by weight of sulfur per 100 parts of rubber will cover the most commonly practiced range. I have found that 0.5 to 2.5 parts by weight of zinc peroxide per 100 parts of rubber will effectively retard vulcanization or increase the Mooney scorch time of such a mixture. The Mooney scorch time, as run on test samples, gives a good indication of the process scorching possibilities of a particular rubber mix.

The second method by which I prefer to practice the process of my invention, comprises varying the amount of zinc oxide and zinc peroxide incorporated in the rubber mix, that is, decreasing the amount of zinc oxide from the quantity usually used and adding zinc peroxide in an amount sufficient to overcome the problem of scorch and to give a high-test rubber product. In practicing my invention in this manner I find that the physical properties of the rubber product are improved. I prefer to speak of this method as one in which some of the zinc oxide is replaced by zinc peroxide in amount sufficient to give better properties than those obtained by the use of zinc oxide alone plus the additional advantage of overcoming the problem of scorch. In this case I find that successful results may be obtained when 0.25 to 5 parts by weight of zinc oxide per 100 parts of rubber and 0.25 to 5 parts by weight of zinc peroxide per 100 parts of rubber are incorporated into the rubber mix. Normally, I find it sufficient to use from 1 to 3 parts by weight of zinc oxide per 100 parts of rubber and from 1 to 3 parts by weight of zinc peroxide per 100 parts of rubber. For instance, rubber mixes in which N-cyclohexyl-2-benzothiazole sulfenamide is the accelerator usually contain from 0.25 to 1.75 parts by weight of the accelerator and 2 to 3 parts by weight of sulfur, per 100 parts of rubber. In such mixes I have found that the problem of scorch may be overcome and the physical properties of the final rubber product may be improved if zinc oxide in the range of 0.25 to 5 parts by weight and zinc peroxide in the range of 0.25 to 5 parts by weight, per 100 parts of rubber, are added to said mixes. 0.35 to 0.65 part by weight of N-cyclohexyl-2-benzothiazole sulfenamide with 2 to 2.75 parts by weight of sulfur, per 100 parts of rubber, will cover the most commonly practiced range, and in these mixes I have found that the scorch problem may be overcome and the physical properties of the final rubber product improved if zinc oxide in the range of 1 to 3 parts by weight together with 1 to 3 parts by weight of zinc peroxide, per 100 parts of rubber, is added to said mixes.

In the following examples of my invention the amounts, particular ingredients, conditions, etc. are given as typical and are not to be construed to unduly narrow the scope of my invention.

The antioxidant used in the following examples was Thermoflex-A which is a mixture of 25% di-p-methoxy-diphenylamine, 25% diphenyl-p-phenylene-diamine and 50% phenyl-B-naphthalamine.

EXAMPLE I

A rubber mix or master batch was made up which contained the following:

| | Parts by weight |
|---|---|
| Smoked sheets | 100 |
| HAF carbon black (pH 9.1) | 50 |
| Zinc oxide | 5 |
| Antioxidant | 1 |
| Stearic acid | 3 |
| L. V. asphaltum oil | 3 |
| Sulfur | 2.5 |
| Santocure | 0.5 |
| | 165.0 |

This rubber mix was divided into four portions and different amounts of zinc peroxide were added to three of the portions. Mooney scorch tests were run on the four portions, three of which contained zinc peroxide, with the following results:

| Parts by Weight of ZnO₂ Per 100 Parts of Rubber | Mooney Scorch | |
|---|---|---|
|  | at 250° F. | at 265° F. |
| 0 (Control) | 24 min | 14 min. |
| 1 | 32 min | 18 min. |
| 2 | 30 plus min | 22 min. |
| 4 | 30 plus min | 26½ min. |

EXAMPLE II

Four separate rubber mixes or batches were made up, each of which contained the following, in addition to variable amounts of zinc peroxide:

| | Parts by weight |
|---|---|
| Smoked sheets | 100 |
| HAF carbon black (pH 9.1) | 50 |
| Zinc oxide | 5 |
| Antioxidant | 1 |
| Stearic acid | 3 |
| L. V. asphaltum oil | 3 |
| Sulfur | 2.5 |
| Santocure | 0.5 |
| | 165.0 |

The first batch or mix contained no zinc peroxide. The second, third and fourth batches contained 0.50, 1.00 and 2.00 parts by weight of zinc peroxide per 100 parts of rubber respectively. A Mooney scorch test was run on each of the four batches. The batch or rubber mix containing no zinc peroxide had a Mooney scorch time of 20 minutes at 250° F. The second mix or batch containing 0.50 part by weight of zinc peroxide had a Mooney scorch time of 24 minutes at 250° F. The third batch or mix containing 1.00 part by weight of zinc peroxide had a Mooney scorch time of 31 minutes at 250° F. The fourth batch containing 2.00 parts by weight of zinc peroxide had a Mooney scorch time of 33 minutes at 250° F.

EXAMPLE III

Three separate rubber mixes or batches were made up with varying amounts of zinc oxide and zinc peroxide. The composition of the three rubber mixes was as follows:

| | 1 | 2 | 3 |
|---|---|---|---|
| | Parts by Weight | Parts by Weight | Parts by Weight |
| Smoked Sheets | 100.00 | 100.00 | 100.00 |
| HAF Carbon Black (pH 9.1) | 50.00 | 50.00 | 50.00 |
| Zinc Oxide | 3.00 | 2.00 | 1.00 |
| Stearic Acid | 3.00 | 3.00 | 3.00 |
| Antioxidant | 1.00 | 1.00 | 1.00 |
| L. V. Asphaltum Oil | 3.00 | 3.00 | 3.00 |
| Sulfur | 2.50 | 2.50 | 2.50 |
| Santocure | 0.50 | 0.50 | 0.50 |
| Zinc Peroxide | | 1.20 | 2.40 |
| | 163.00 | 163.00 | 163.40 |

The first rubber mix containing no zinc peroxide and 3 parts by weight of zinc oxide, had a Mooney scorch time of 10 minutes at 265° F. The second rubber mix containing 1.20 parts by weight of zinc peroxide and 2.00 parts by weight of zinc oxide had a Mooney scorch time of 13 minutes at 265° F. The third rubber mix containing 2.40 parts by weight of zinc peroxide and 1.00 part by weight of zinc oxide had a Mooney scorch time of 16 minutes at 265° F.

The following physical test data was obtained on the 3 separate rubber mixes or batches.

PHYSICAL TEST DATA
*Stress-strain (original)*

| Min. Cure at 280° F.—300% Modulus | 1 | 2 | 3 |
|---|---|---|---|
| | #/in.² | #/in.² | #/in.² |
| 30 | 1,790 | 1,900 | 1,680 |
| 45 | 1,950 | 2,230 | 2,210 |
| 60 | 1,990 | 2,270 | 2,370 |
| 90 | 1,910 | 2,230 | 2,320 |

PHYSICAL TEST DATA
*Stress-strain (aged 48 hrs. at 212° F.)*

| Min. Cure at 280° F.—200% Modulus | 1 | 2 | 3 |
|---|---|---|---|
| | #/in.² | #/in.² | #/in.² |
| 30 | 1,290 | 1,260 | 1,020 |
| 45 | 1,210 | 1,385 | 1,130 |
| 60 | 1,300 | 1,420 | 1,370 |
| 90 | 1,250 | 1,450 | 1,410 |

ANGLE ABRASION DATA, LOSS IN C. C.'s, 11° ANGLE, 32 LB. LOAD, 1,600 REVOLUTIONS

| | | | |
|---|---|---|---|
| 60 | 3.05 | 2.87 | 2.47 |
| 90 | 3.53 | 2.92 | 2.52 |

As will be apparent to those skilled in the art gradually increasing modulus and lessened abrasion loss for the mixes containing zinc peroxide are good properties, and give a rubber product with improved physical properties compared to the product made from the mix containing no zinc peroxide.

As will be apparent to those skilled in the art, various modifications of this invention can be made, or followed, in the light of the foregoing disclosure and discussion, without department from the spirit or scope of the disclosure or from the scope of the claims.

I claim:

1. In the process of making a rubber product wherein the rubber mix, containing an organic accelerator of vulcanization, sulfur and a furnace carbon black having a pH of from 8.6 to 10.5, is preformed and vulcanized and wherein the problem of scorch is encountered that improvement which comprises adding from 0.25 to 4.5 parts of zinc peroxide per 100 parts of rubber to said rubber mix as the effective scorch preventive.

2. In the process of making a natural rubber product wherein the rubber mix, containing an organic accelerator of vulcanization, sulfur and from 10 to 65 parts per 100 parts of natural rubber of a furnace carbon black having a pH of from 8.6 to 10.5, is preformed and vulcanized and wherein the problem of scorch is encountered that improvement which comprises adding from 0.25 to 4.5 parts of zinc peroxide per 100 parts of natural rubber to said rubber mix as the effective scorch preventive.

3. In the process of making a natural rubber product wherein the rubber mix, containing from 0.35 to 0.65 part of N-cyclohexyl-2-benzothiazole sulfenamide per 100 parts of natural rubber, 2 to 2.75 parts of sulfur per 100 parts of natural rubber and 40 to 65 parts per 100 parts of natural rubber of a furnace carbon black having a pH of from 8.6 to 10.1, is preformed and vulcanized, that improvement which comprises adding from 0.5 to 2.5 parts of zinc peroxide per 100 parts of natural rubber to said rubber mix.

4. In the process of making a rubber product wherein the rubber mix, containing an organic accelerator of vulcanization, sulfur and a furnace carbon black having a pH of from 8.6 to 10.5, is preformed and vulcanized and wherein the problem of scorch is encountered that improvement which comprises adding from 0.25 to 5 parts of zinc oxide per 100 parts of rubber and from 0.25 to 5 parts of zinc peroxide per 100 parts of rubber to said rubber mix as the effective scorch preventive.

5. In the process of making a rubber product wherein the rubber mix, containing an organic accelerator of vulcanization, sulfur and 10 to 65 parts per 100 parts of rubber of a furnace carbon black having a pH of from 8.6 to 10.5, is preformed and vulcanized and wherein the problem of scorch is encountered that improvement which comprises adding from 0.25 to 5 parts of zinc oxide per 100 parts of rubber and from 0.25 to 5 parts of zinc peroxide per 100 parts of rubber to said rubber mix as the effective scorch preventive.

6. In the process of making a rubber product wherein the rubber mix containing from 0.25 to 1.75 parts of N-cyclohexyl-2-benzothiazole sulfenamide per 100 parts of rubber, 2 to 3 parts of sulfur per 100 parts of rubber and 10 to 65 parts per 100 parts of rubber of a furnace carbon black having a pH of from 8.6 to 10.5, is preformed and vulcanized, that improvement which comprises adding from 0.25 to 5 parts of zinc oxide per 100 parts of rubber and from 0.25 to 5 parts of zinc peroxide per 100 parts of rubber to said rubber mix.

7. In the process of making a natural rubber tread wherein the rubber mix, containing from 0.35 to 0.65 part of N-cyclohexyl-2-benzothiazole sulfenamide per 100 parts of natural rubber, 2 to 2.75 parts of sulfur per 100 parts of natural rubber and 40 to 65 parts per 100 parts of natural rubber of a furnace carbon black having a pH of from 8.6 to 10.1, is preformed and vulcanized, that improvement which comprises adding from 1 to 3 parts of zinc oxide per 100 parts of natural rubber and from 1 to 3 parts of zinc peroxide per 100 parts of natural rubber to said rubber mix.

8. A vulcanizable rubber mix comprising, rubber, furnace carbon black having a pH of from 8.6 to 10.5, sulfur, an organic accelerator of vulcanization, from 0.25 to 5 parts of zinc oxide and from 0.25 to 5 parts of zinc peroxide, all parts per 100 parts of said rubber, to prevent scorch.

9. A vulcanizable rubber mix comprising, rubber, furnace carbon black having a pH of from 8.6 to 10.5, sulfur, N-cyclohexyl-2-benzothiazole sulfenamide and zinc peroxide.

10. A vulcanizable rubber mix comprising, rubber, furnace carbon black having a pH of from 8.6 to 10.5, sulfur, N-cyclohexyl-2-benzothiazole sulfenamide, from 0.25 to 5 parts of zinc oxide and from 0.25 to 5 parts of zinc peroxide, all parts per 100 parts of said rubber.

LYNN HARBISON.

REFERENCES CITED

The following references are of record in the file of this patent:

UNITED STATES PATENTS

| Number | Name | Date |
|---|---|---|
| 1,791,876 | Somerville | Feb. 10, 1931 |
| 1,871,037 | Cadwell | Aug. 9, 1932 |
| 2,170,191 | Fisher | Aug. 22, 1939 |

OTHER REFERENCES

"Rubber Age" (New York) 50, 21–27 (1941).
"India Rubber World," vol. 119, October 1948, pp. 57–62.